(12) United States Patent
Arnetoli (10) Patent No.: US 7,966,736 B2
(45) Date of Patent: Jun. 28, 2011

(54) GRASS-CUTTING HEAD WITH SPIRAL GUIDE CHANNELS FOR THE CUTTING LINE

(75) Inventor: Fabrizio Arnetoli, Florence (IT)

(73) Assignee: Arnetoli Motor Di Arnetoli Fabrizio, Reggello (IT)

( * ) Notice: Subject to any disclaimer, the term of this patent is extended or adjusted under 35 U.S.C. 154(b) by 273 days.

(21) Appl. No.: 12/092,312

(22) PCT Filed: Nov. 2, 2005

(86) PCT No.: PCT/IT2005/000626

§ 371 (c)(1),
(2), (4) Date: May 1, 2008

(87) PCT Pub. No.: WO2007/052311

PCT Pub. Date: May 10, 2007

(65) Prior Publication Data

US 2008/0282552 A1    Nov. 20, 2008

(51) Int. Cl.
*A01D 34/416*    (2006.01)

(52) U.S. Cl. .......................................... 30/276; 30/347

(58) Field of Classification Search ............... 30/276, 30/347; 56/12.7
See application file for complete search history.

(56) References Cited

U.S. PATENT DOCUMENTS

| | | | |
|---|---|---|---|
| 2,533,619 A * | 12/1950 | Pokras | 451/467 |
| 4,097,991 A | 7/1978 | Proulx | |
| 4,104,797 A | 8/1978 | Ballas | |
| 4,107,901 A | 8/1978 | Moore | |
| 4,114,269 A | 9/1978 | Ballas, Sr. | |
| 4,145,809 A | 3/1979 | Proulx | |
| 4,148,141 A | 4/1979 | Hoff | |
| 4,161,820 A | 7/1979 | Moore | |
| 4,169,311 A | 10/1979 | Evenson et al. | |
| 4,203,212 A | 5/1980 | Proulx | |
| 4,245,454 A * | 1/1981 | Zien | 56/12.7 |
| 4,253,238 A * | 3/1981 | Sheldon | 30/276 |
| 4,259,782 A | 4/1981 | Proulx | |
| 4,271,595 A | 6/1981 | Rahe | |
| 4,274,201 A | 6/1981 | Oberg et al. | |
| 4,287,670 A | 9/1981 | Baker | |
| 4,366,621 A * | 1/1983 | Mitchell | 30/276 |
| 4,651,421 A | 3/1987 | Zerrer | |
| 4,738,085 A | 4/1988 | Nishio et al. | |
| 4,805,306 A | 2/1989 | Baba | |
| 4,813,140 A | 3/1989 | Calcinai | |
| 4,823,465 A | 4/1989 | Collins | |
| 4,835,867 A * | 6/1989 | Collins et al. | 30/276 |
| 4,882,843 A | 11/1989 | Baba | |
| 4,893,410 A | 1/1990 | Hoffmann et al. | |
| 4,942,664 A | 7/1990 | Zatulovsky | |
| 4,959,904 A | 10/1990 | Proulx | |
| 4,989,321 A | 2/1991 | Hoffmann | |
| 5,010,649 A | 4/1991 | Hoffmann | |
| 5,095,688 A | 3/1992 | Fabrizio | |
| 5,136,782 A | 8/1992 | Calcinai | |

(Continued)

*Primary Examiner* — Kenneth E. Peterson
(74) *Attorney, Agent, or Firm* — McGlew and Tuttle, P.C.

(57) ABSTRACT

The grass-cutting head (101) has a body (103) forming a housing for at least one spool of cutting line (F1; F2), provided with at least one outlet hole (111) of an end of the cutting line wound on said spool positioned inside the head. For each outlet hole, a guide channel for the cutting line is also provided, extending from the inside of the housing towards the hole and having an inclined trend, gradually moving away from said axis of rotation.

21 Claims, 13 Drawing Sheets

U.S. PATENT DOCUMENTS

| | | |
|---|---|---|
| 5,295,306 A | 3/1994 | Sugihara et al. |
| 5,490,641 A | 2/1996 | Worthing |
| 5,526,572 A | 6/1996 | Sugihara et al. |
| 5,657,542 A | 8/1997 | White, III et al. |
| 6,141,879 A | 11/2000 | Arnetoli |
| 6,163,964 A | 12/2000 | Calcinai |
| 6,779,274 B2 * | 8/2004 | Peterson et al. ............... 30/347 |
| 6,851,191 B2 | 2/2005 | Arnetoli |

* cited by examiner

GRASS-CUTTING HEAD WITH SPIRAL GUIDE CHANNELS FOR THE CUTTING LINE

TECHNICAL FIELD

The present invention relates to a grass-cutting head for cutting vegetation, and more specifically to a grass-cutting head of the line type, that is, in which the cutting member is composed of a line projecting radially from the head, and which cuts the surrounding vegetation through centrifugal force.

STATE OF THE ART

For gardening jobs, both at amateur and professional level, grass-cutting heads are commonly used to cut grass and other vegetation, provided with cutting lines projecting radially from a main body of the head and which, thanks to the centrifugal force exerted thereon and to the rapid rotation of the head about the axis thereof, cut the vegetation.

Examples of cutting heads of this type are described in the following United States patents: U.S. Pat. No. 4,097,991, U.S. Pat. No. 4,104,797, U.S. Pat. No. 4,145,809, U.S. Pat. No. 4,161,820, U.S. Pat. No. 4,259,782, U.S. Pat. No. 4,203,212, U.S. Pat. No. 4,274,201, U.S. Pat. No. 4,651,421, U.S. Pat. No. 4,738,085, U.S. Pat. No. 4,805,306, U.S. Pat. No. 4,813,140, U.S. Pat. No. 4,823,465, U.S. Pat. No. 4,882,843, U.S. Pat. No. 4,893,410, U.S. Pat. No. 4,942,664, U.S. Pat. No. 4,959,904, U.S. Pat. No. 4,989,321, U.S. Pat. No. 5,010,649, U.S. Pat. No. 5,526,572, U.S. Pat. No. 5,095,688, U.S. Pat. No. 5,136,782, U.S. Pat. No. 5,295,306, U.S. Pat. No. 5,490,641, U.S. Pat. No. 5,657,542, U.S. Pat. No. 6,141,879, U.S. Pat. No. 6,163,964, U.S. Pat. No. 6,851,191.

In conventional grass-cutting heads, the outlet hole of the cutting line can be produced directly in the body forming the housing of the line spool (as in U.S. Pat. No. 4,148,141), or in metal bushings inserted in respective seats produced in the perimeter wall, typically cylindrical, of the body housing the spool (U.S. Pat. No. 4,097,991).

U.S. Pat. No. 4,271,595 describes a grass-cutting head of the line type wherein two cutting lines project from the body of the head inclined with respect to the radial direction. For this purpose the bushings defining the outlet holes of the lines have a channel for the lines to pass through with a rectilinear but substantially inclined trend with respect to the radial direction, instead of being parallel to said direction as in the case of conventional grass-cutting devices. This particular arrangement has the function of reducing wear and overheating of the line at high head rotation speeds. The hole of the bushing opens onto the cylindrical surface of the body of the head.

In all conventional heads, including the head produced as indicated in U.S. Pat. No. 4,271,595, the cutting line is subject to frequent breakages due to high impact against any obstructions which may be present around the grass-cutting head (such as stones, clods of hard soil or the like) and also due to any particularly coarse vegetation present. Breakage of the line often occurs at the level of the hole through which the line is fed from the body forming the housing for the spool on which the cutting line is wound. When this occurs, considerable difficulties can be encountered when passing a new portion of line required to continue with the cutting operation through the hole. In particular, if the spool accidentally rotates even by a slight angle after breakage of the line, the severed end of the cutting line retracts completely inside the body of the head and said body must be opened to pass the end of the line into the bushing or hole to make it project from the body of the head through said hole by a length sufficient to allow correct operation of the lengthening devices with which grass-cutting heads are normally provided.

U.S. Pat. No. 4,114,269 describes a grass-cutting head of the line type, wherein the outlet hole of the cutting line is delimited by two rectilinear edges, parallel to the axis of rotation of the head. The front edge, or the edge farther forward with respect to the direction of rotation of the head, has a tear-drop shaped cross section, that is, which is thicker than the remaining part of the approximately cylindrical wall of the body housing the cutting spool, in which wall the outlet holes of the cutting line are produced. This conformation has the object of reducing strains and overheating of the line, but does not overcome the aforesaid drawbacks, related to retraction of the broken end of the line into the housing of the spool.

OBJECTS AND SUMMARY OF THE INVENTION

The object of the present invention is to produce a grass-cutting head which overcomes entirely or in part the aforesaid drawbacks and which in particular reduces the tendency of the line to break due to impact with obstructions surrounding the head during cutting and/or facilitates projection of the line, even if it breaks at the level of the outlet hole, or at the level of the outlet bushing from the body of the head.

These and other objects and advantages, which shall be apparent to those skilled in the art from reading the text hereunder, are obtained in substance with a head as claimed in claim 1, The dependent claims relate to further possible and advantageous features of the invention.

In substance, the invention provides a grass-cutting head with an axis of rotation and a body forming the housing for at least one spool of cutting line, provided with at least one outlet hole of an end of said cutting line wound on said spool, which also comprises, for each hole, a guide channel for the cutting line, extending from the inside of said housing towards the outlet hole and having an inclined development, gradually moving away from said axis of rotation. According to an advantageous embodiment, the outlet hole is on a surface inclined by an angle differing from 90° with respect to a radial plane containing the axis of rotation and passing through the center of the hole. In substance, in the preferred embodiment, the hole or each hole is located on a surface which intersects a substantially cylindrical wall of the body of the head.

In practice, the channel is produced in portions of the body of the head which project gradually with respect to a basic shape substantially with a circular section of said body and the line is fed from said projections with a non-radial orientation, but inclined with respect to a radial plane. In this way improved operation of the head is obtained, with regard to the consequences of impact with possible obstructions around the head during operation.

In a practical embodiment, the outlet hole or each outlet hole can define a direction of projection of the line from the body of the head inclined by an angle between 30° and 90° and preferably between 60° and 90° with respect to a radial direction.

The guide channel of the cutting line can have, preferably, an approximately spiral shape, where spiral is intended generally as a curve which has a variable radius of curvature to move gradually away from an axis or center, coincident with the axis of rotation of the grass-cutting head.

Preferably, the surface on which the outlet hole is located forms with said radial plane an angle between 0° and 80°, preferably between 0° and 45° and even more preferably between 0° and 30°.

According to a possible embodiment of the head according to the invention, associated with each of the outlet holes of the line are respective tangential tabs, projecting with respect to the body of the grass-cutting head. These tabs (advantageously arranged on the projections inside which the guide channels of the lines are produced) can be interchangeable and optionally provided with toothing, i.e. serrated on the surface radially facing towards the outside of the head.

In a possible embodiment, in a top plan view the body of the head has a substantially circular shape and, for said hole or for each of said holes, integral with said body is a projection with a radially increasing extension, inside which said guide channel extends. The profile of the projections is preferably approximately a portion of spiral.

In a possible embodiment, the body of the grass-cutting head comprises: a cup portion, defining a housing for the spool of cutting line; an annular portion coupled to said cup portion, defining, together with said cup portion, said guide channel or channels; and a removable closing member.

According to an advantageous embodiment, each of said guide channels extends along an angle equal to at least 30°, preferably equal to or greater than 45° and even more preferably equal to or greater than 60°, for example also between 80° and 120°, about the axis of rotation of said grass-cutting head.

According to a different aspect, the present invention relates to a grass-cutting head with an axis of rotation and a body forming a housing for at least one spool of cutting line, provided with at least one outlet hole of an end of said cutting line wound on the spool, which has a toothed outer profile, a respective outlet hole of the cutting line being positioned at the level of each tooth of said profile. The grass-cutting head as a whole will therefore no longer have, in a top plan view, the conventional circular shape, but will be characterized by the projections forming said teeth, at the level of which the line projects with a non-radial direction of projection.

In practice, each tooth of said toothed profile has a first side inclined by an angle not exceeding 45° and preferably between 0° and 30° with respect to a radial direction, on which the respective outlet hole of the line is produced. Moreover, according to a preferred embodiment of the invention each tooth has a second curvilinear side with a preferably approximately spiral development. A guide channel for the cutting line extends inside each of said teeth.

BRIEF DESCRIPTION OF THE DRAWINGS

The invention shall be better understood by following the description and accompanying drawing, which shows practical non-limiting examples of embodiment of the invention. More specifically, in the drawing.

DETAILED DESCRIPTION OF THE PREFERRED EMBODIMENTS OF THE INVENTION

With initial reference to FIG. 1 to 4, in a first embodiment the grass-cutting head according to the invention, indicated as a whole with 1, has a body 3 composed of a main part substantially in the form of a casing, shown in FIGS. 1 to 4, and optionally a closing cover, not shown, which defines with the cup portion, a compartment 13 to house a spool, indicated schematically with 5 (FIGS. 2 and 4), on which one or more cutting lines F1, F2, are wound. Externally, the body 3 of the grass-cutting head 1 has a substantially circular extension in a top plan view, the maximum diameter of which is defined by the diameter of a circular flange 7. Extending under the circular flange 7, with basic conformation with a substantially circular section of the body 3, are two projections indicated with 9.

These projections have an approximately spiral development, in the sense that they are defined by an external curvilinear surface 9A which moves gradually away from the body of the head 3, from a point 9B of connection with the cylindrical wall of the body 3, to a point 9C of maximum radial distance from the axis of rotation A-A of the grass-cutting head. Moreover, each projection 9 has a flat surface (in the example shown) indicated with 9D, which has an inclination of an angle $\beta$ (FIG. 2) with respect to a radial plane, that is, a plane containing the axis of rotation A-A, passing through the central area of the surface 9D. The angle formed by the direction of projection of the cutting line F1, F2 with respect to the radial direction, is indicated with $\gamma$. The sum of the angles $\beta$ and $\gamma$ can be equal to 90° if the line projects orthogonally to the frontal surface 9D of the projection 9, but this is not binding, as can be seen in the example shown.

In practice, the projections 9 form teeth projecting from the body of the grass-cutting head 1, which in the example shown have sides (9A, 9D) differing from each other in shape and/or inclination.

In an approximately central position the surface 9D has a hole 11 from, which the cutting line F1 or F2 project. In the example shown the hole 11 is produced directly in the base material forming the body 3 (or the lower part of said body) and the projections 9. It would also be possible for the hole 11 to be formed in a bushing inserted inside the base material forming the projection 9 and/or the body 3.

Figure 1:
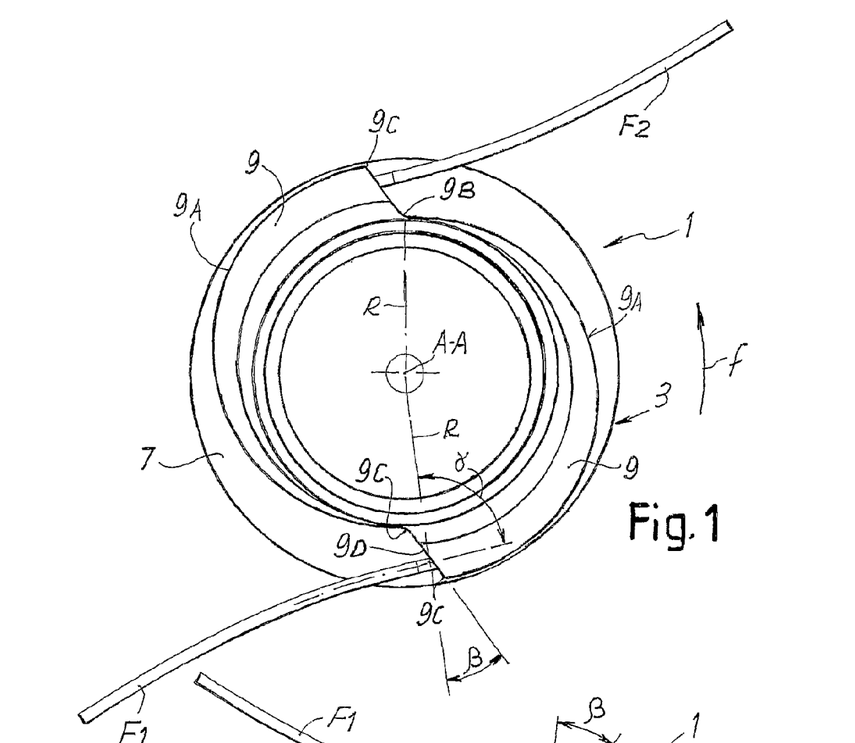
FIGS. 1 and 2 show a bottom view and a top view of a grass-cutting head according to the invention in a first embodiment, from which an optional cover has been removed to view the internal structure.
Figure 2:
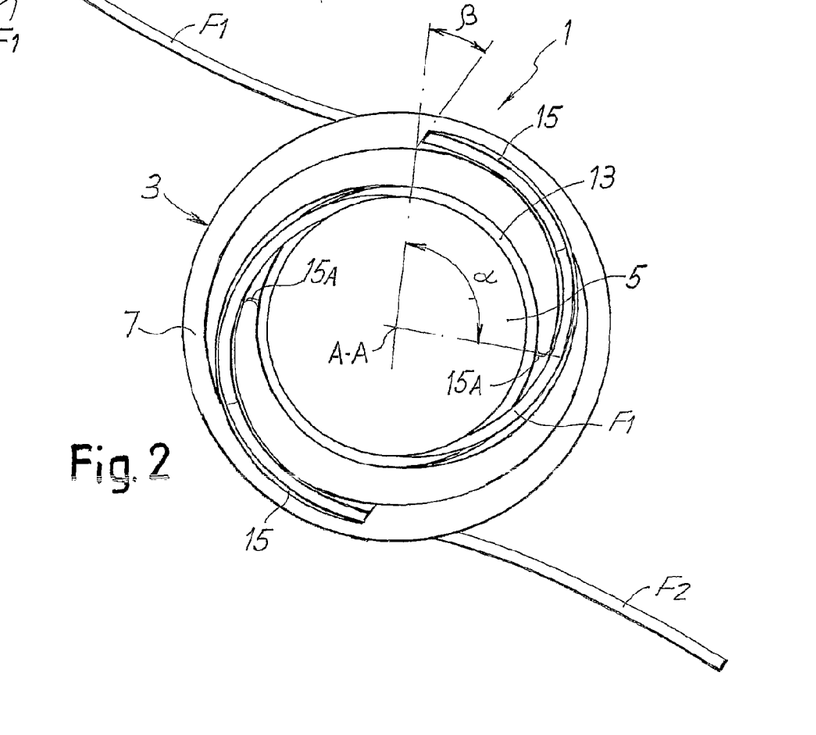
Figure 3:
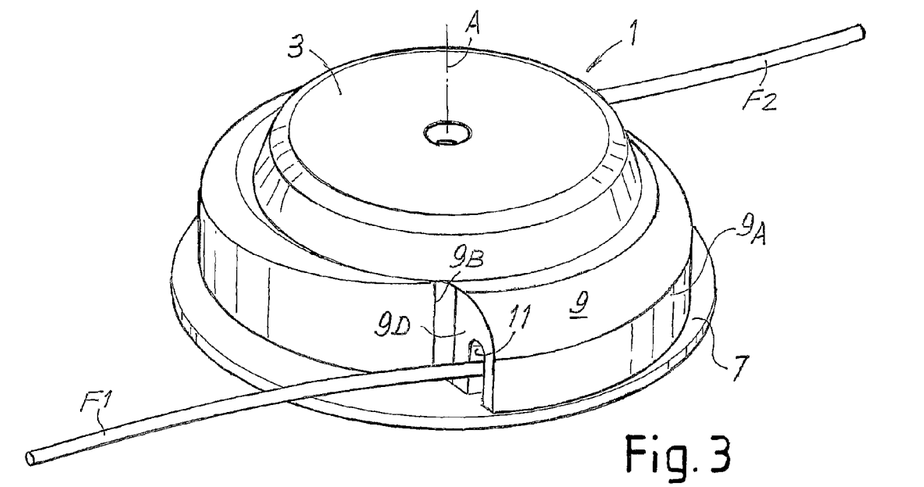
FIGS. 3 and 4 show perspective views according to two different angles of the head in FIGS. 1 and 2.
Figure 4:
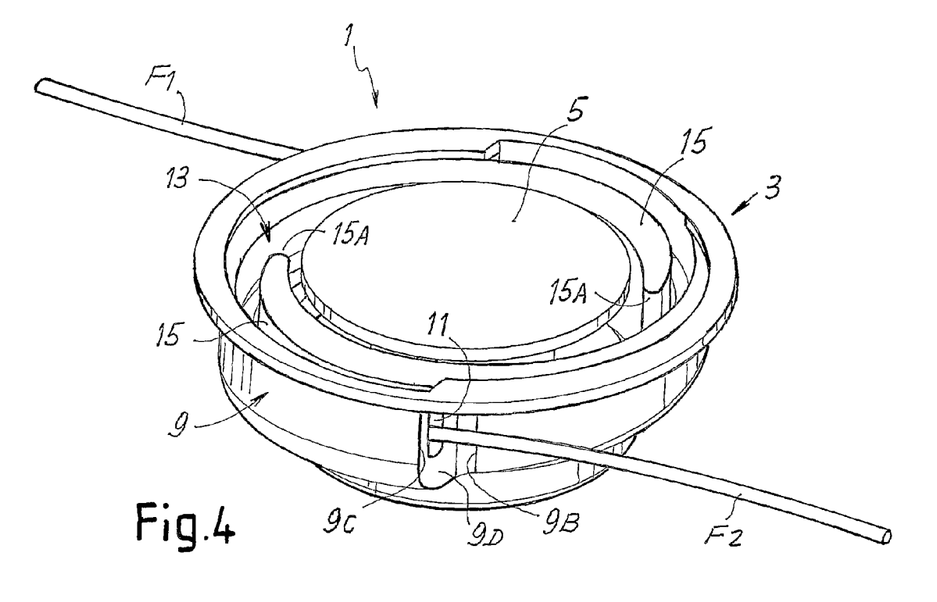

As can be seen in particular in FIGS. 2 and 4, both a housing, indicated with 13, for the spool 5, and a pair of guide channels 15 produced in the material forming the projections 9 extending more or less spirally, are defined inside the body 3. Each of these channels has an inlet, which is radially innermost at the level of a rounded corner 15A produced in the base material forming the body 3, and an outlet at the level of the respective outlet hole 11 of the cutting line F1 or F2, said hole defining the radially outermost point of the channel. Alternatively, the channels can be made of a different material to the base material of the head of the body, for example by metal inserts inserted in an injection mold for plastic materials. The projections 9 can also be made of the same material as the body 3 or of a different material, optionally molded together with the body 3 or by inserts arranged in the mold prior to injection of the resin with which the body 3 can be made. Alternatively, the head can be made of metal parts.

Each guide channel 15 therefore extends for an angle α (FIG. 2) about the axis of rotation A-A of the grass-cutting head. The line F1, F2 projects with the free end thereof from the respective hole 11 in a direction which substantially forms the extension of the spiral defining the median line of the channel 15. It must be understood that spiral shape is intended herein not necessarily as a spiral in a mathematical or geometric sense, but in the more general sense a shape of the channel 15, wherein this extends from the inlet (at the level of the edge 15A) to the outlet formed by the hole 11 extending gradually away from the axis A-A in a radial direction outwards. If necessary, the channel 15 could have a conformation which is rectilinear or formed of rectilinear portions with gradually variable angles from the inlet to the outlet.

With this configuration two positive effects are substantially obtained. On the one hand, when the head rotates (the direction of rotation is indicated with the arrow F in FIG. 1) the side surface, that is the side 9A of each of the two projections 9, tends to move any obstructions, such as stones, clods of hardened soil, particularly coarse vegetation or the like, away from the hole 11 so that these obstructions do not knock against the line F1 or F2 too close to the point at which it projects from the grass-cutting head 1. This means that any breakage of the line caused by a violent impact against an obstruction occurs at a certain distance from the outlet hole 11, thereby avoiding the risk of the free end of the severed line remaining inside the body 3 of the head 1.

In the second place, even if breakage of the line were to take place at the level of the hole 11, subsequent projection of a new portion of line F1, F2, to restore the cutting function of the grass-cutting head 1, would nonetheless be possible thanks to the fact that a large portion of the last turn of cutting line F1, F2 inside the grass-cutting head 1 is guided in the respective spiral channel 15. Contrary to the case of conventional heads, therefore, even if the line were to break close to the wall of the head and, therefore, to the hole 11, this would not make it impossible to restore the cutting length of the said line.

The angular extension α of the guide channel 15 does not necessarily have to be as wide as shown in FIGS. 1 to 4 (here approximately equal to or slightly greater than 90°). On the contrary, this angle can also be equal to 60° or less, although a relatively wide angle is particularly useful to guarantee the second function described above.

Figure 5:
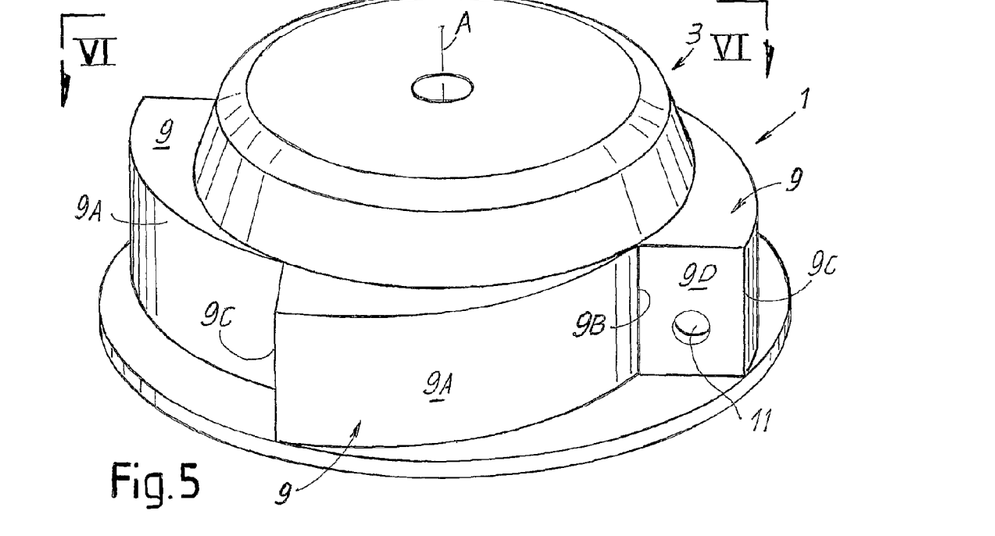
FIG. 5 shows a perspective view of a head analogous to the head in FIGS. 1 to 4, but configured for a greater number of cutting lines.
Figure 6:
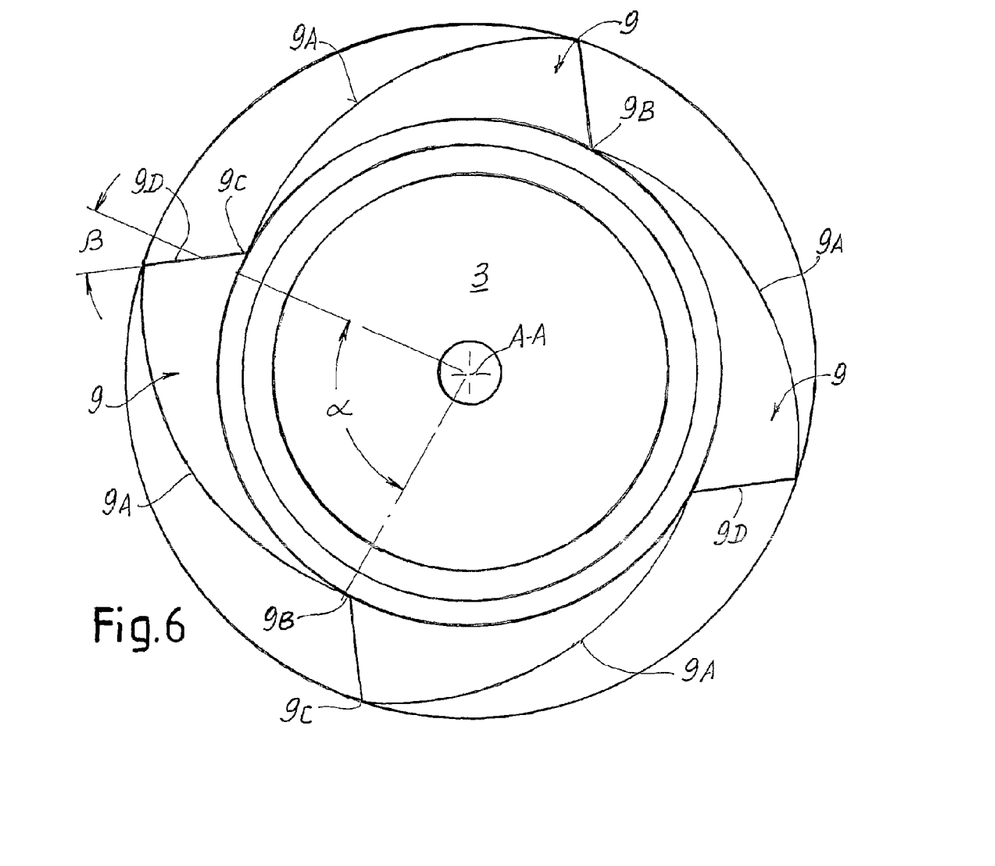
FIG. 6 shows a plan view according to VI-VI in FIG. 5.

FIGS. 5 and 6 show, in a perspective view and in a bottom plan view according to VI-VI in FIG. 5, a slightly modified embodiment of the head described above. The same numbers indicate the same or equivalent parts to those of the previous embodiment. In this case, the body 3 of the head, or more precisely the lower part of said body, has four projections 9 rather than two, so that four cutting lines (not shown) can project from the respective holes 11 on the grass-cutting head 1. In this case the angle α along which the four guide channels 15 extend will be slightly below 90°.

FIG. 7 to 14 show an improved embodiment of the head according to the invention. The head, indicated as a whole with 101, has a body 103 formed by a cup portion 103A, an annular portion 103B coupled permanently to the portion 103A (i.e. even by gluing, welding or the like, or with screws, rivets, pins or in another way) and a cover 103C removable to allow access to the inside of a compartment housing the spool of cutting line. This compartment is defined by the portions 103A and 103B of the body 103. In this embodiment, the spool, indicated with 105, is produced as shown in U.S. Pat. No. 6,851,191, the content of which is explicitly referred to here as an integral part of the present description, and which can be referred to for further constructional details.

Inside, this spool 105 is an elastically stressed slider 106, cooperating with a double series of toothings produced on the inside of the hub of the spool 105, to allow lengthening of the line wound on said spool. The slider 106 slides axially on a pin 108 torsionally coupled to the portion 103A of the body 103 of the head. There is a torsional coupling also between the slider 106 and the pin 108 composed of a series of grooves 108A (FIG. 7) on the pin 108 and corresponding teeth on the slider 106. The movement according to the double arrow f106 of the slider 106 is obtained by a button 110 projecting through a hole 103D produced in the central part of the cover 103C. The button 110 projects downwards from the head, when this is mounted on the brush cutter or other operating device, so that the user can press the rotating head on the ground and thereby cause repeated actions of alternate sliding on the slider 106 and consequent lengthening in steps of the cutting line wound on the spool 105, all as described in greater detail in the aforesaid U.S. Pat. No. 6,851,191.

The cover 103C has elastic tabs 103E with which it connects in notches 103F produced in the annular portion 103B of the body 103 of the head. The elastic tabs 103E are accessible from the outside (FIG. 8) so that, by means of pressure thereon, the cover 103C can be released from the body 103 formed by the portions 103A, 103B of the head 101.

Once the portions 103A and 103B of the body 103 of the grass-cutting head 101 are coupled together they define a body having a basic extension with a substantially circular section, from which projections 109, produced in part on the portion 103A and in part on the portion 103B of the body 103, project in a radial direction. The projections 109 have an approximately spiral conformation, in the sense that their surface or side wall 109A has an approximately spiral trend (in the plan view), moving gradually away from the axis A-A of rotation of the head starting from a point 109B of connection to a substantially cylindrical surface of the central body 103 until reaching an area 109C of maximum radial dimension. Each projection 109 also has an approximately radial surface 109D onto which a respective outlet hole 111 of the cutting line opens. The direction of exit of the cutting line is therefore in this case substantially tangential, that is, substantially orthogonal to a plane passing through the axis of rotation A-A of the head.

Figure 7:
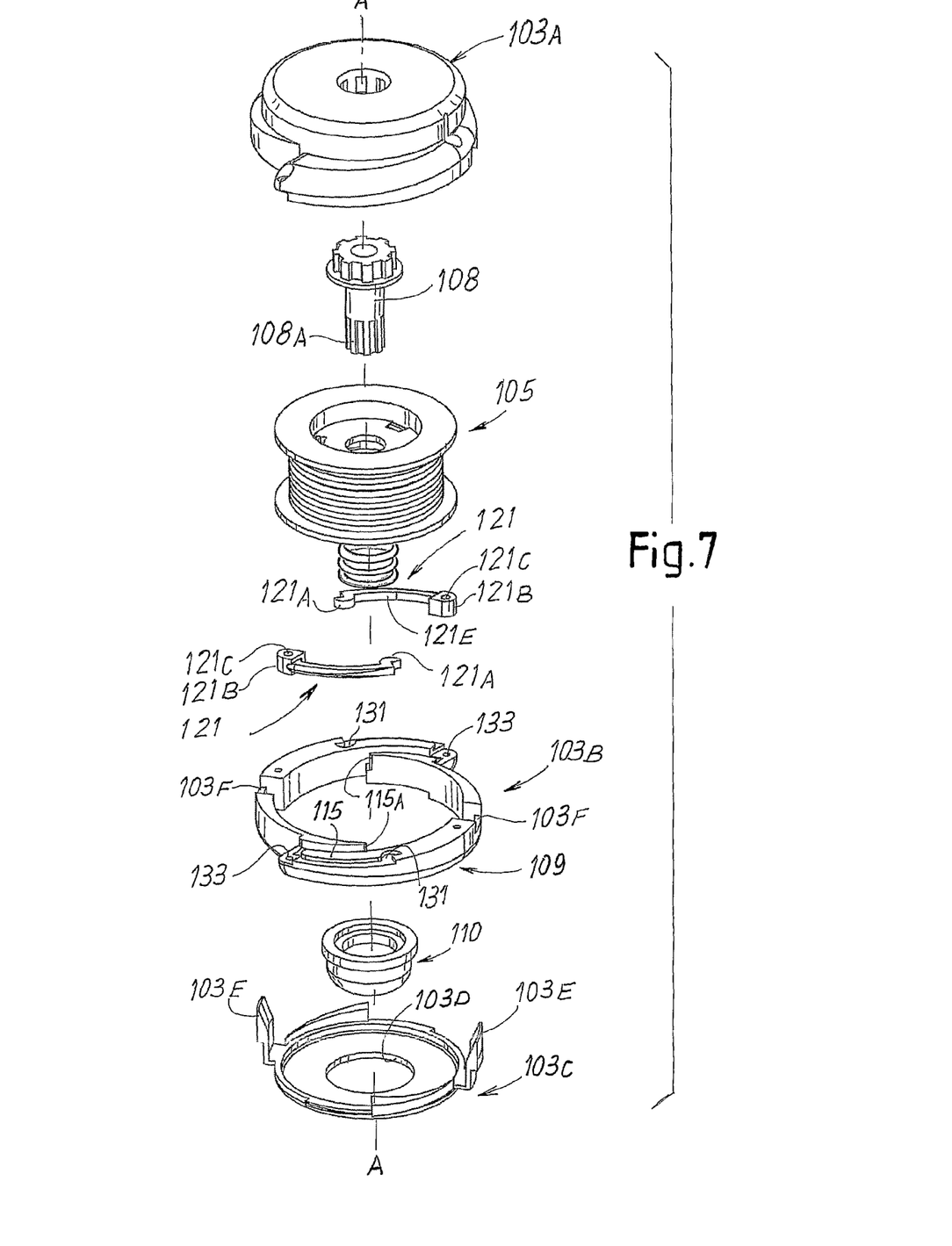
FIG. 7 shows an exploded axonometric view of a head according to an improved embodiment of the invention.

The projections 109 are produced as mentioned above in part in the material forming the portion 103A and in part in the material forming the portion 103B of the body 103 (see FIG. 7). Coupling of these two portions forms a channel 115 through which the respective cutting line (not shown) is guided. In substance, each of the two channels 115 extends from a rounded corner 115A with a substantially spiral extension to the front surface 109D of the respective projection 109.

In the example shown respective tangential tabs, which in this specific embodiment are interchangeable, are associated and made integral with each of the two projections 109. For this purpose, each tab 121 has a system for connection to i.e. reversible engagement with the body 103 of the grass-cutting head 101. To obtain this reversible engagement, in the embodiment shown, each tab 121 has a first hook-shaped end 121A which is inserted into a corresponding recess 131 produced in the projection 109. The opposite end 121B of each tab 121 has a through hole 121C (i.e. shaped like an eyelet) and is positioned at the level of the outlet hole 111 of the cutting line. As can be seen in particular in FIG. 9, in this embodiment the interchangeable tab 121 actually forms one side of the hole 111. Due to how the tab 121 is positioned, the end 121B thereof defines a supporting surface for the cutting line.

Each tangential tab 121 is connected to the respective projection 109 by first inserting the hook shaped end 121A into the corresponding recess 131 and then inserting the entire interchangeable tab into the seat defined between the two coupled portions 103A, 103B. A pin, a screw or the like is inserted into a hole 133 of the projection 109, which is in alignment with the through hole 121C of the respective tab 121. The tangential tab 121 is thus permanently fastened to the head until subsequent removal of the screw, pin or the like inserted in the hole 133, to allow replacement of the tab 121, for example due to wear.

Figure 8:
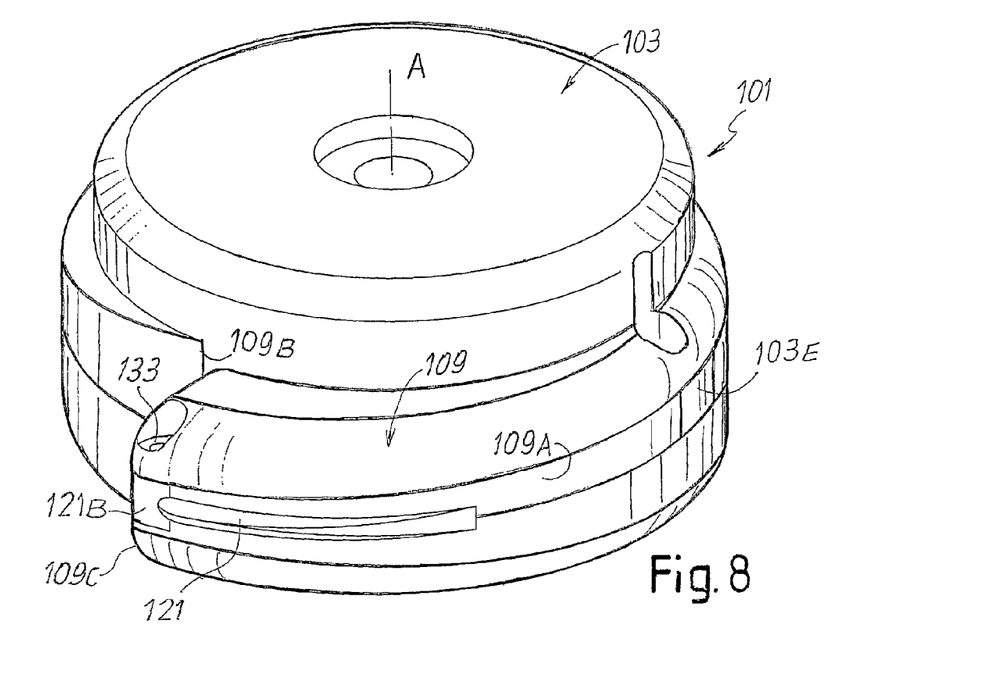
FIG. 8 shows a perspective view of the head in FIG. 7 in an assembled layout.
Figure 9:
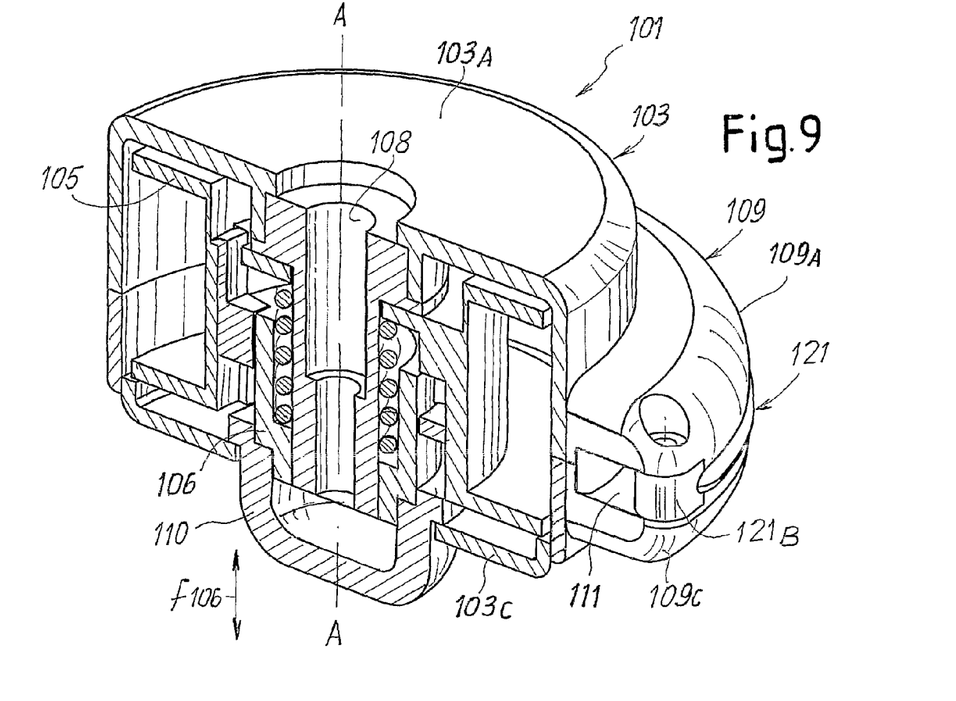
FIG. 9 shows a sectional perspective view according to a diametric plane of the head in FIGS. 7 and 8.
Figure 10:
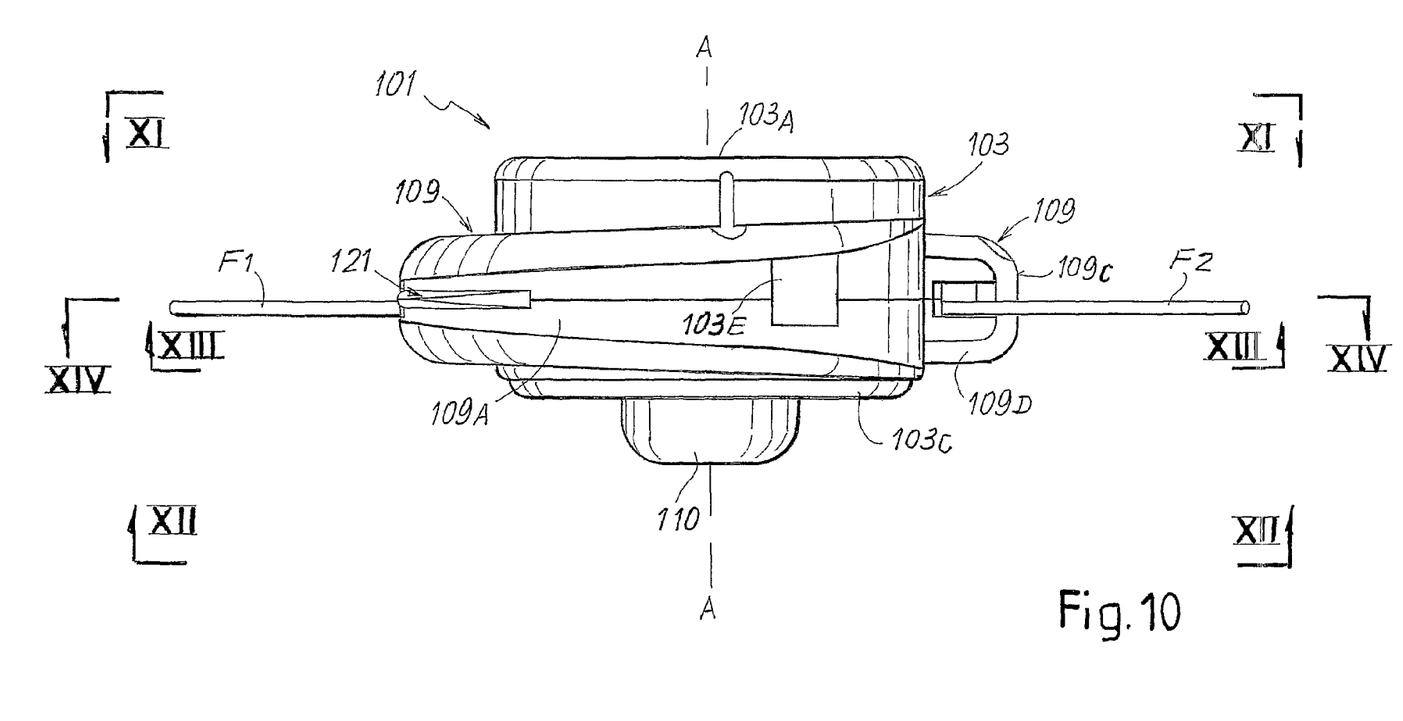
FIG. 10 shows a side view of the head in FIGS. 7 to 9.
Figure 11:
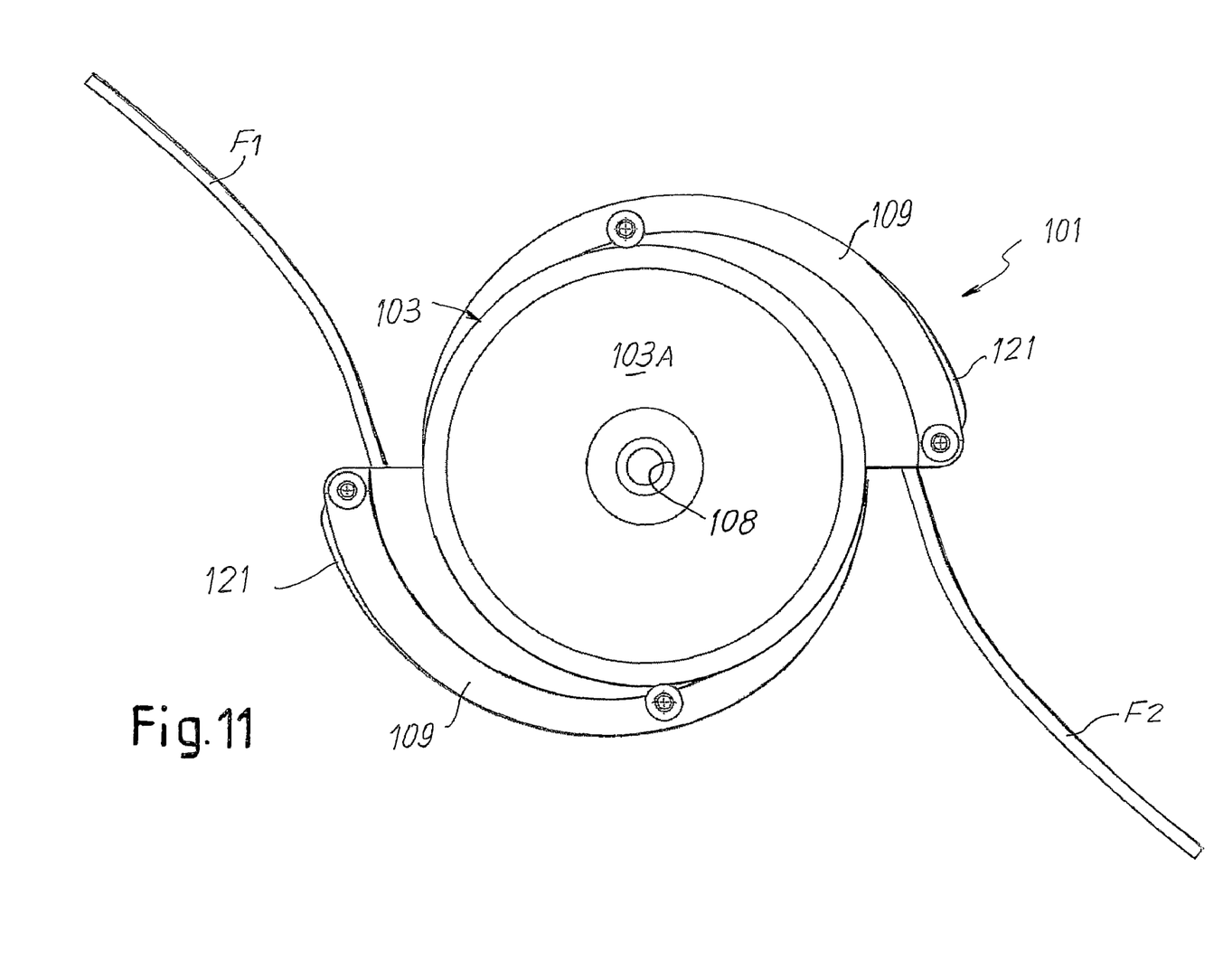
FIGS. 11 to 14 show views and sections according to transverse planes with trace XI-XI; XII-XII; XIII-XIII and XIV-XIV of FIG. 10 respectively, wherein in FIG. 13 the head is shown without the closing cover.
Figure 12:
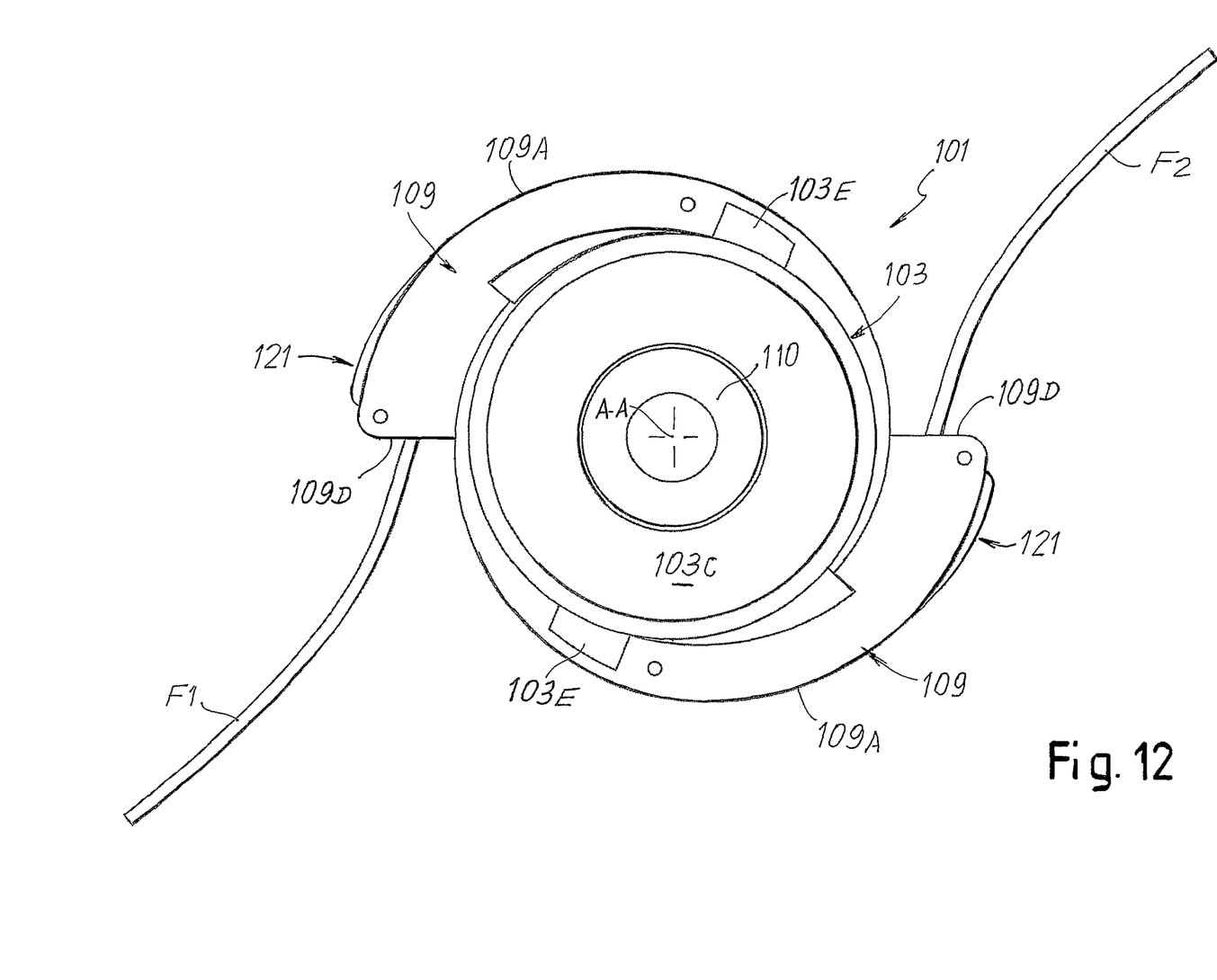
Figure 13:
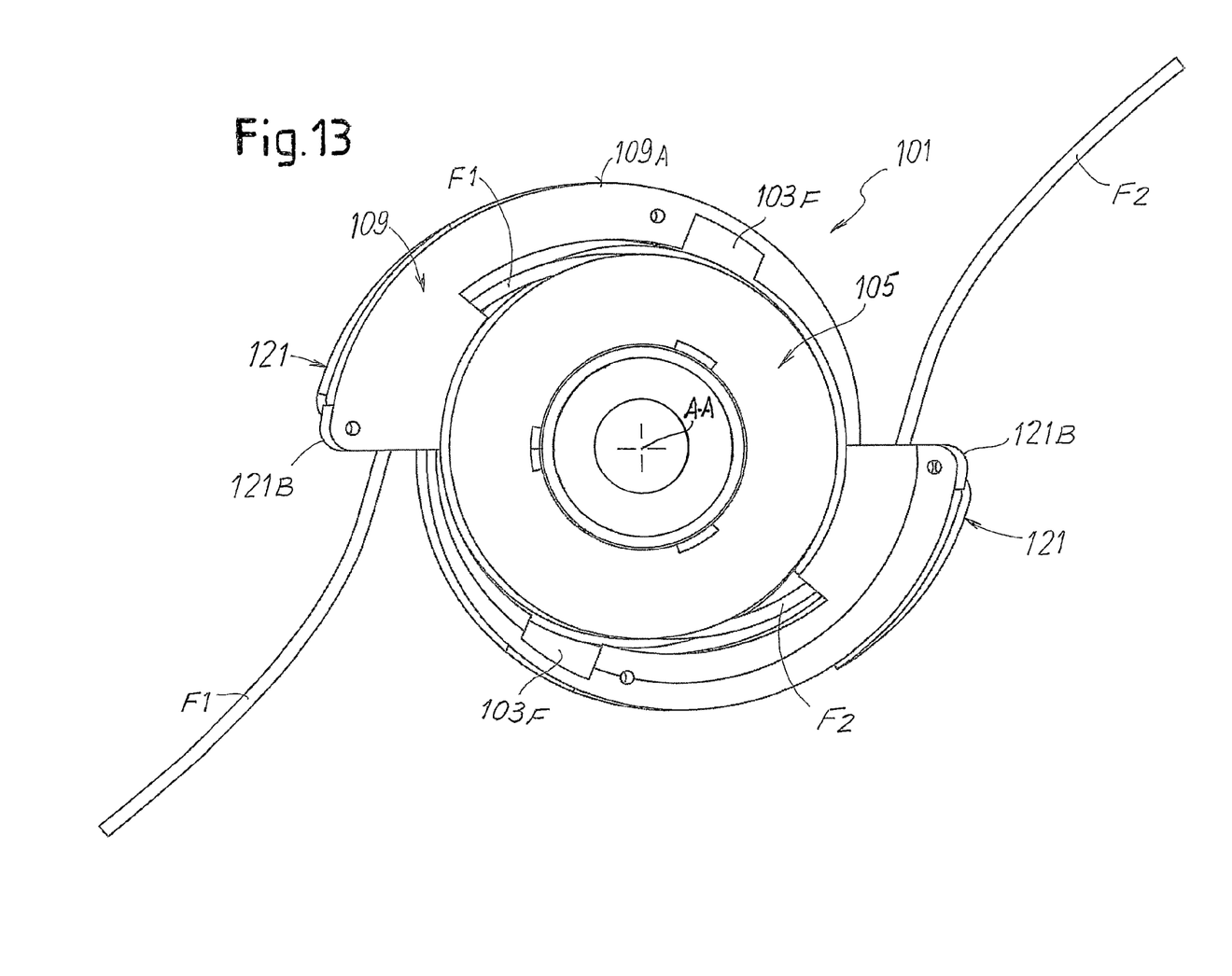
Figure 14:
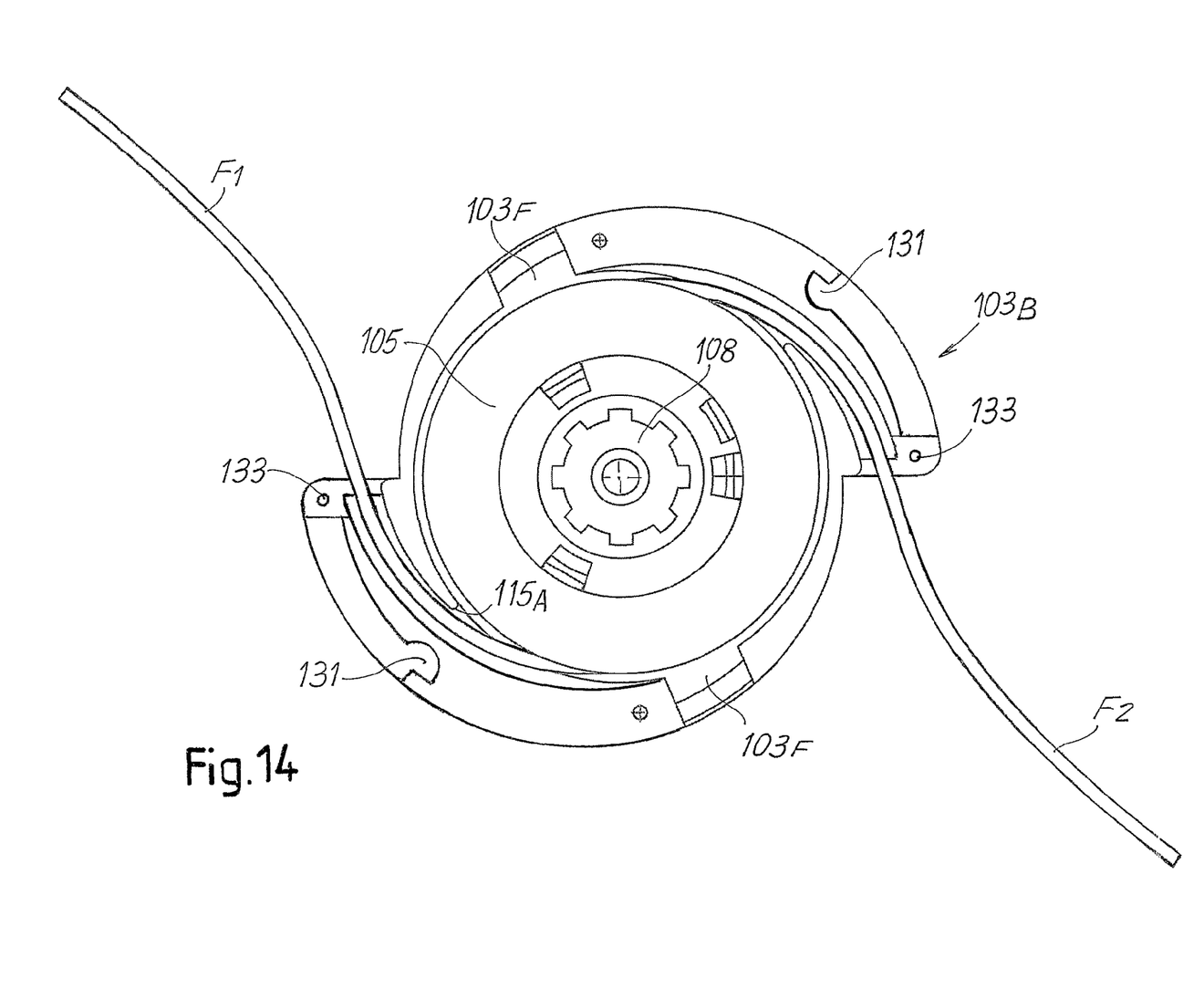

As can be seen in particular in FIGS. 7 and 8, once the portions 103A, 103B and the tabs 121 have been assembled, the guide channel 115 is actually delimited in part by walls formed of the material of which the body 103 (more specifically the portions 103A, 103B thereof) of the grass-cutting head 101 is composed and in part by the radially inward facing surface 121E (FIG. 7) of the respective tangential tab 121.

It would also be possible to omit the tabs 121 and to produce the body 103 of the head 101 solely with two portions 103A, 103B coupled to each other, besides the cover 103C. The outlet hole 111 of the line could also be defined in a bushing, possibly made of metal, inserted in the material forming the respective projection 109. However, the use of interchangeable tangential tabs 121 is particularly advantageous because it allows worn tabs to be replaced with new ones, preserving the integrity of the body 103 of the head. Tabs made of a sturdier material than the material forming the body 103 of the grass-cutting head 101 allow the useful life of the head to be prolonged even if they are not interchangeable, thanks to their increased durability. For example, the tabs could be made of metal and the rest of the head of molded synthetic resin. The increase in cost which this implies compared to a head entirely made of synthetic resin is slight, as the tabs have a limited mass. Alternatively, the tabs could be made of the same material as the body 103. In this case, they form a sort of deposit of material which, although becoming worn, protects the remaining part of the head from premature wear.

Moreover, it is also possible to use interchangeable tangential tabs 121 of a different shape depending on the type of vegetation to be cut. For example, when cutting particularly coarse grass, it is possible to use tangential tabs 121 which have a toothing on the surface facing radially outward, said toothing performing severing of coarser vegetation.

In any case, the tangential tabs 121 offer further protection against breakage of the cutting line caused by impact thereof against obstructions present which may be found around the grass-cutting head during use.

Figure 15:
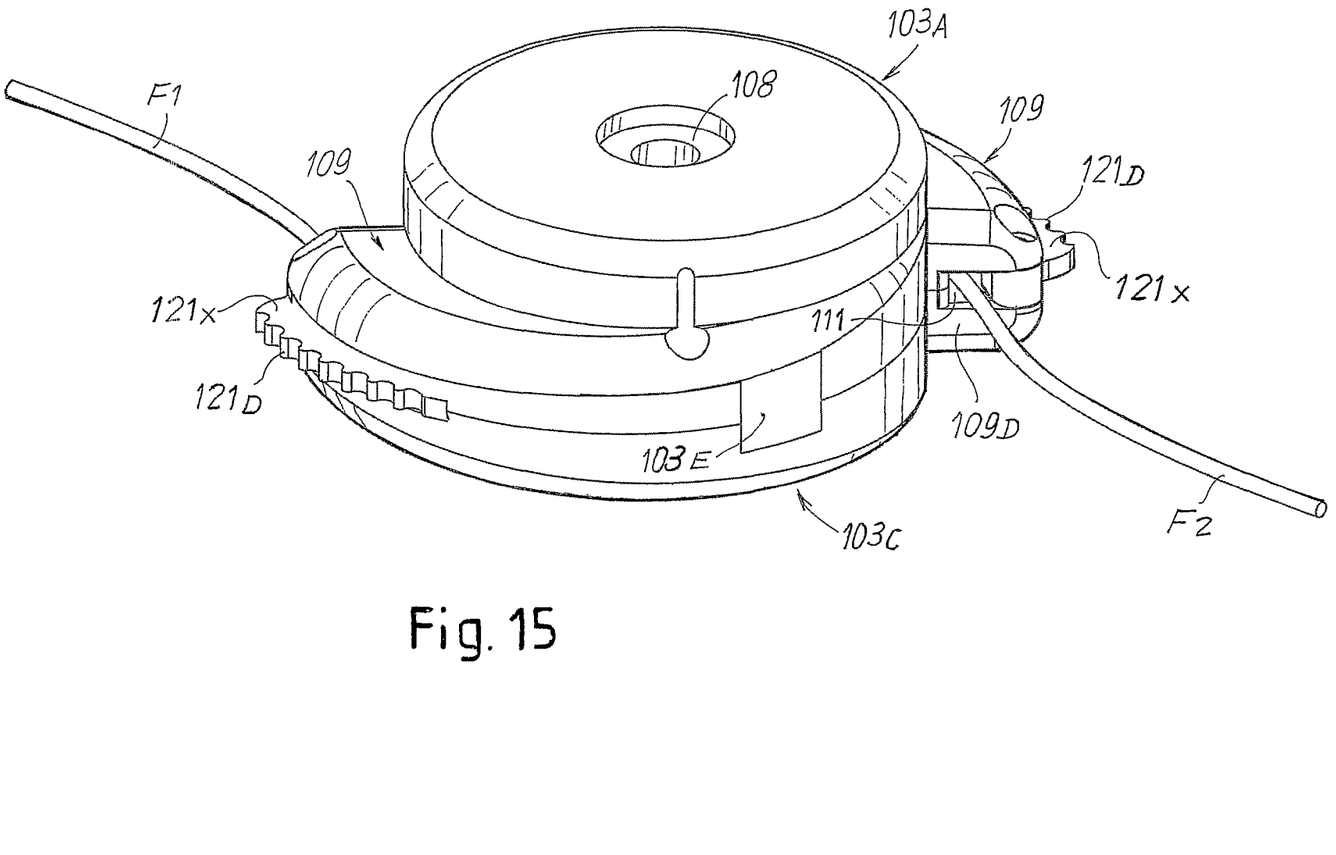
FIG. 15 shows a perspective view of a modified embodiment of the head.

FIG. 15 shows a perspective view of the head in FIGS. 7 to 14, modified as regards the form of the tabs, here indicated with 121X. The same numbers indicate the same or equivalent parts to those in FIGS. 7 to 14. The tabs 121X are produced, in this case, with an outer toothing 121D. This toothing has the function of severing or weakening the vegetation or other obstructions, such as clods of earth, which may be found around the head during use thereof, so as to perform a mechanical action preliminary to the cutting action of the line F1, F2.

Figure 16:
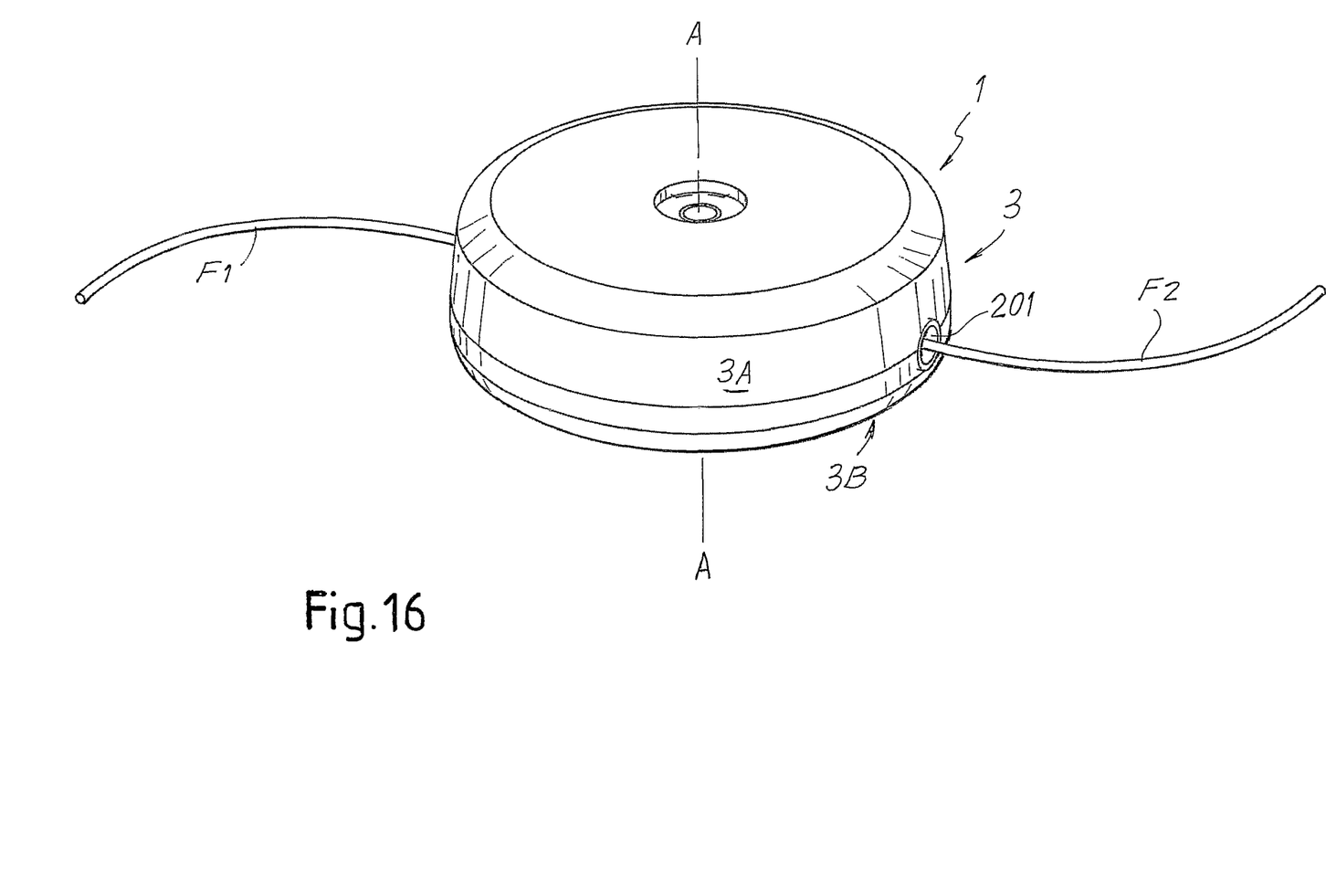
FIGS. 16 and 17 show a perspective view and a section according to a median plane of a head in a further embodiment.
Figure 17:
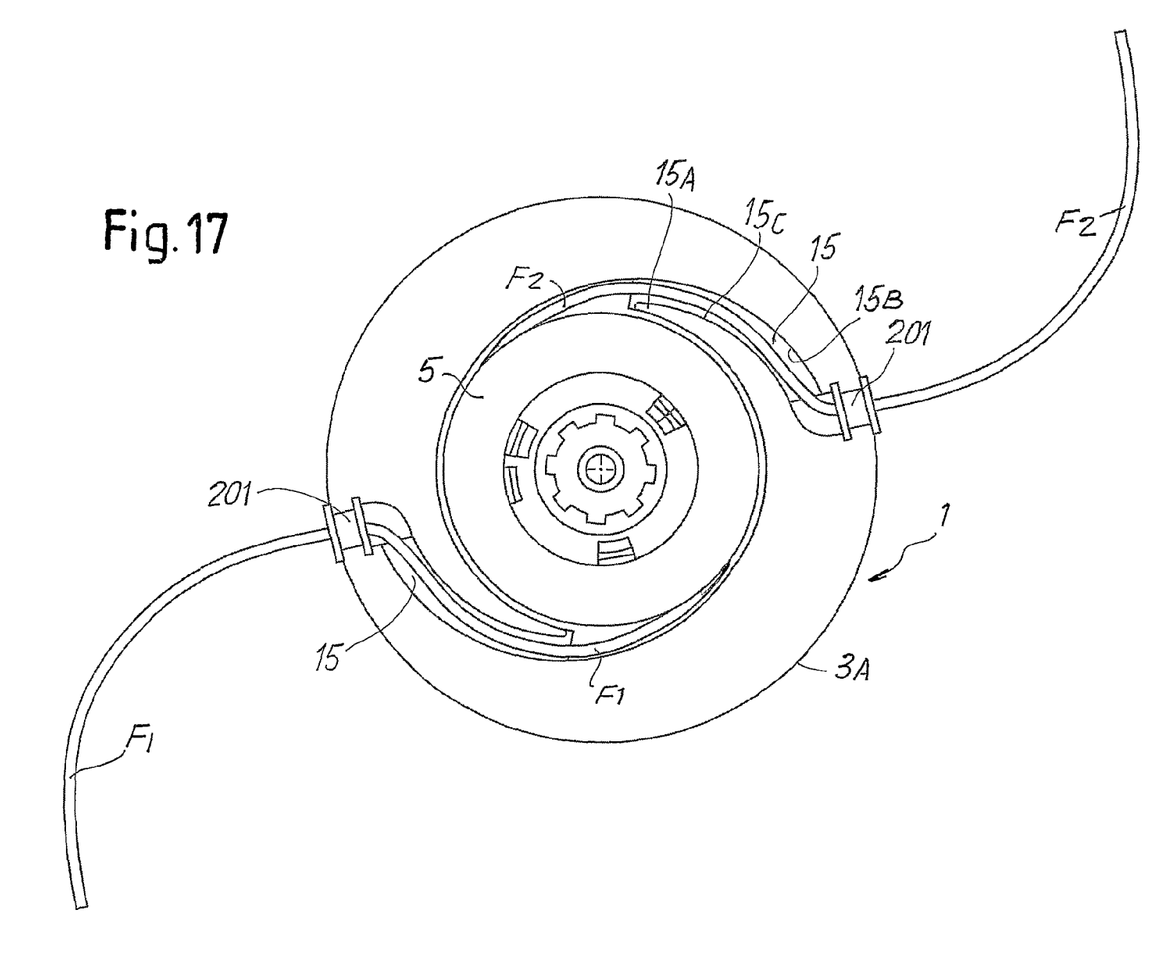

FIGS. 16 and 17 show a different configuration of the head, wherein the outlet holes of the cutting line are radial rather than inclined towards the tangential direction. As can be seen in FIG. 17, which represents a section along a plane separating the portions 3A and 3B of the body 3 of the head, housed therein is a spool 5 wound on which is the cutting line which projects through radial holes produced in bushings 201 inserted in the body of the head 1. Between the spool 5 and each outlet hole of each bushing 201 a respective channel 15 is produced, substantially spiral in shape and defined by two surfaces 15B, 15C, the inlet of which is defined by a rounded corner 15A. The shape of the channels 15 is substantially equivalent to that of the channels shown in FIGS. 1 and 2, with the difference that they end at the level of the bushings with radial outlet 201.

It is understood that the drawing only shows an embodiment provided by way of a practical example of the finding, which may vary in forms and arrangements without however departing from the scope of the concept on which said finding is based.

The invention claimed is:

1. A grass-cutting head with an axis of rotation, the grass-cutting head comprising:
   a body forming a housing for at least one spool of cutting line, provided with at least one outlet hole for an end of said cutting line wound on said spool, said body comprising a projection and a substantially cylindrical surface, said projection having a shape of a portion of a spiral, said projection gradually projecting from said substantially cylindrical surface of said body, said projection ending with an end surface, said end surface intersecting said substantially cylindrical surface, said outlet hole being arranged on said end surface;
   a guide channel in communication with said at least one outlet hole for receiving the cutting line, said guide channel extending from the inside of said housing towards the outlet hole and having an inclined shape, gradually moving away from said axis of rotation, said guide channel being provided in said projection, said guide channel defining a radially outward concave guiding surface formed in said body, said concave guiding surface having a concavity facing the axis of rotation, wherein a portion of said cutting line inside said guide channel has a concave path in an operating phase and a non-operating phase, said concave path being the same in said operating phase and in said non-operating phase.

2. Grass-cutting head as claimed in claim 1, wherein said outlet hole is on a surface inclined by an angle differing from 90° with respect to a radial plane containing the axis of rotation and passing through the center of the hole.

3. Grass-cutting head as claimed in claim 2, wherein the outlet hole defines a direction of projection of the line from the body of the head which is not radial and inclined by an angle between 30° and 90° with respect to a radial direction.

4. A grass-cutting head as claimed in claim 2, wherein the outlet hole defines a direction of projection of the line from the body of the head which is not radial and inclined by an angle between 60° and 90° with respect to a radial direction.

5. Grass-cutting head as claimed in claim 1, wherein said guide channel has an approximately spiral shape, said at least one projection spanning substantially half of a circumference of said body.

6. Grass-cutting head as claimed in claim 5, wherein the surface on which the outlet hole is located forms with a radial plane an angle between 0° and 80°.

7. Grass-cutting head as claimed in claim 5, wherein the surface on which the outlet hole is located has a substantially radial extension with respect to the axis of rotation of the head.

8. Grass-cutting head as claimed in claim 5, wherein the surface on which the outlet hole is located forms with a radial plane an angle between 0° and 45°.

9. Grass-cutting head as claimed in claim 5, wherein the surface on which the outlet hole is located forms with a radial plane an angle between 0° and 30°.

10. Grass-cutting head as claimed in claim 1, wherein the outlet hole defines a direction of projection of the line from the body of the head which is not radial and inclined by an angle between 30° and 90° with respect to a radial direction.

11. Grass-cutting head as claimed in claim 1, wherein the outlet hole defines a direction of projection of the line from the body of the head which is not radial and inclined by an angle between 60° and 90° with respect to a radial direction.

12. A grass-cutting head as claimed in claim 1, wherein a portion of said cutting line extends from the inside of said housing through said guide channel and said at least one outlet hole to a position located outside of said projection.

13. Grass-cutting head as claimed in claim 1, wherein said projection is made integral with said body, with the same material of which said body is formed or with a different material.

14. A grass-cutting head, the grass-cutting head comprising:
a spool of cutting line;
a grass-cutting head body forming a housing for said spool of cutting line, said body being movable about an axis of rotation, said body comprising a cylindrical outer surface and a side surface formed by a series of spiral portions arranged one after another, said spiral portions being defined by at least two projections extending from said cylindrical outer surface, each of said projections comprising an inner projection surface, each of said at least two projections having a first end and a second end, wherein a thickness of said at least projection increases from said first end to said second end, each of said at least projections extending in a circumferential direction of said body, each of said at least one projections having an end surface located at said second end, said end surface comprising an outlet hole, said inner projection surface defining at least a portion of a guide channel extending from an interior portion of said housing to said outlet hole, said outlet hole being in communication with said guide channel, wherein a portion of said cutting line extends from the interior portion of said housing through said guide channel and said at least one outlet hole to a position located outside of said body and said at least one projection
wherein one end of said guide channel is located at a first distance from said axis of rotation, another end of said guide channel being located at a second distance from the axis of rotation, said another end of said guide channel being adjacent to said end surface, said second distance being greater than said first distance, wherein each of said at least two projections spans substantially half of a circumference of said body.

15. A grass-cutting head in accordance with claim 14, wherein said channel extends in an inclined direction, said channel having an inclined shape, said thickness of said at least one projection at said first end being less than said thickness of said at least one projection at said second end.

16. A grass-cutting head in accordance with claim 15, wherein said at least one projection has a shape of a portion of a spiral.

17. A grass-cutting head in accordance with claim 16, wherein said end surface intersects said substantially cylindrical surface.

18. A grass-cutting head, the grass-cutting head comprising:
a spool of cutting line;
a grass-cutting head housing comprising a recess, said recess receiving said spool of cutting line, said grass-cutting head housing being movable about an axis of rotation, said grass-cutting head housing comprising an outer surface defining at least a substantially cylindrical outer wall portion and at least one projection, said at least one projection comprising an inner projection surface and an outer projection surface, said outer projection surface and said inner projection surface extending about said axis of rotation, said at least one projection having a first end and a second end, said first end being adjacent to one portion of said substantially cylindrical outer wall portion, said second end being adjacent to another portion of said substantially cylindrical outer wall portion, said at least one projection having a thickness extending in a radial direction from said substantially cylindrical outer wall portion, wherein said thickness of said at least one projection increases from said first end to said second end in a circumferential direction of said grass-cutting head, said outer projection surface extending from said first end to said second end in said circumferential direction to define an outer circumferential portion of said body, said at least one projection having an end surface located at said second end, said end surface defining at least a portion of an outlet hole, said inner projection surface defining at least a portion of a guide channel extending from a position at or adjacent to said recess to said outlet hole, said outlet hole being in communication with said guide channel, wherein a portion of said cutting line extends from the interior portion of said housing through said guide channel and said at least one outlet hole to a position located outside of said at least one projection, said portion of said cutting line extending in said circumferential direction in a rotating state of said grass cutting head, said portion of said cutting line extending in said circumferential direction in a non-rotating state of said grass cutting head
wherein one end of said guide channel is located at a first distance from said axis of rotation, another end of said guide channel being located at a second distance from the axis of rotation, said another end of said guide channel being adjacent to said end surface, said second distance being greater than said first distance, wherein each of said at least one projection spans substantially half of a circumference of said body.

19. A grass-cutting head in accordance with claim 18, wherein said channel extends in an inclined direction such that said channel has an inclined shape, said thickness of said at least one projection at said first end being less than said thickness of said at least one projection at said second end.

20. A grass-cutting head in accordance with claim 19, wherein said at least one projection has a shape of a portion of a spiral.

21. A grass-cutting head in accordance with claim 20, wherein said end surface is substantially perpendicular to said substantially cylindrical outer wall portion.

* * * * *